United States Patent
Vossler

(10) Patent No.: US 9,140,235 B2
(45) Date of Patent: Sep. 22, 2015

(54) VARIABLE LENGTH BLADE TIP MOLDS, TIP ASSEMBLIES AND METHODS FOR MANUFACTURING THE SAME

(75) Inventor: Alexander William Vossler, Greenville, SC (US)

(73) Assignee: General Electric Company, Schenectady, NY (US)

(*) Notice: Subject to any disclaimer, the term of this patent is extended or adjusted under 35 U.S.C. 154(b) by 437 days.

(21) Appl. No.: 13/591,525

(22) Filed: Aug. 22, 2012

(65) Prior Publication Data

US 2014/0056715 A1 Feb. 27, 2014

(51) Int. Cl.
| | |
|---|---|
| F03D 11/00 | (2006.01) |
| F03D 1/06 | (2006.01) |
| B29C 33/30 | (2006.01) |
| B29L 31/08 | (2006.01) |

(52) U.S. Cl.
CPC ............ *F03D 1/0675* (2013.01); *B29C 33/308* (2013.01); *F03D 1/0641* (2013.01); *F03D 1/0683* (2013.01); *B29L 2031/082* (2013.01); *F05B 2240/302* (2013.01); *F05B 2240/31* (2013.01); *Y02E 10/721* (2013.01); *Y10T 29/49337* (2015.01)

(58) Field of Classification Search
CPC ... F03D 1/0633; F03D 1/0641; F03D 1/0675; F03D 1/0683; F05B 2230/60; F05B 2240/302; F05B 2240/31

USPC .............................. 416/132 B, 225, 226, 228
See application file for complete search history.

(56) References Cited

U.S. PATENT DOCUMENTS

| | | | |
|---|---|---|---|
| 7,393,184 B2* | 7/2008 | Cairo ............................. | 416/225 |
| 7,922,454 B1 | 4/2011 | Riddell | |
| 2009/0084932 A1 | 4/2009 | Livingston | |
| 2009/0155084 A1 | 6/2009 | Livingston et al. | |
| 2009/0169390 A1* | 7/2009 | Nies .......................... | 416/223 A |
| 2010/0143143 A1* | 6/2010 | Judge ............................ | 416/226 |
| 2012/0211637 A1* | 8/2012 | Christiansen et al. ........ | 249/102 |

FOREIGN PATENT DOCUMENTS

WO 2010086297 A2 8/2010

OTHER PUBLICATIONS

Search report issued in connection with EP Application No. 13179978.5, Nov. 27, 2013.

* cited by examiner

*Primary Examiner* — Ninh H Nguyen
(74) *Attorney, Agent, or Firm* — Blake A. Nickles; Ernest G. Cusick; Frank A. Landgraff

(57) ABSTRACT

Variable length blade tip molds include standard tip mold sections having a tapered profile and variable length joint mold sections having first ends and second ends with a constant cross section, wherein the variable length blade tip molds can each produce a plurality of tip assemblies of various lengths.

20 Claims, 4 Drawing Sheets

VARIABLE LENGTH BLADE TIP MOLDS, TIP ASSEMBLIES AND METHODS FOR MANUFACTURING THE SAME

BACKGROUND OF THE INVENTION

The subject matter disclosed herein relates to wind turbines and, more specifically, to blade tip molds, tip assemblies and methods of manufacturing the same for wind turbine rotor blades.

Wind power can be considered one of the cleanest, most environmentally friendly energy sources presently available, and wind turbines have gained increased attention in this regard. A wind turbine can include a tower, generator, gearbox, nacelle, and one or more rotor blades comprising a composite material. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines can thus be placed in a variety of locations to effectively help capture the energy of wind power where present. These locations can include both on-shore and off-shore locations and can potentially be located in a wide variety of different topographical and geological positions. However, the specific wind resources available can widely vary by individual locations. Not only may one wind farm experience great winds than another wind farm, but individual wind turbines within a given wind farm may also experience different wind patterns.

To help capture the most amount of energy from a given location, wind turbine rotor blades may be tailor sized based on the expected amount of wind. However, while different sized turbine blades may improve the efficiency of a given wind turbine, creating multiple turbine blades of different lengths can require multiple molds that can similarly be costly and time intensive to produce.

Accordingly, alternative molds, tip assemblies and methods for manufacturing tip assemblies would be welcome in the art.

BRIEF DESCRIPTION OF THE INVENTION

In one embodiment, a variable length blade tip mold for a tip assembly of a wind turbine rotor blade is disclosed. The variable length blade tip mold includes a standard tip mold section having a tapered profile, and a variable length joint mold section having a first end and a second end with a constant cross section, wherein the variable length blade tip mold can produce a plurality of tip assemblies of various lengths.

In another embodiment, a method of manufacturing a tip assembly from a variable length blade tip mold is disclosed. The method includes manufacturing a standard tip portion of the tip assembly from a standard tip mold section having a tapered profile. The method further includes manufacturing a variable length joint portion of the tip assembly from a variable length joint mold section having a first end and a second end having a constant cross section, wherein the variable length blade tip mold can produce a plurality of tip assemblies of various lengths, and wherein the variable length joint portion connects to the standard tip portion.

In yet another embodiment, a plurality of tip assemblies manufactured from a variable length blade tip mold is disclosed. Each of the plurality of tip assemblies include a standard tip portion having a tapered profile, and a variable length joint portion having a first end and a second end having a constant cross section, wherein the variable length joint portions for at least two of the tip assemblies are different lengths.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
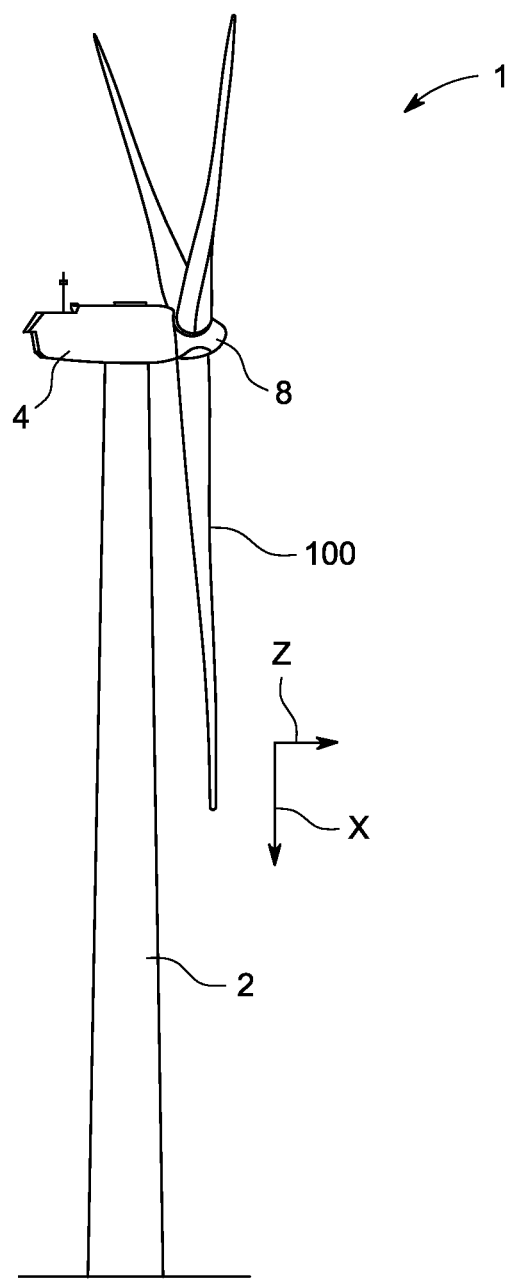
FIG. 1 is a schematic illustrate of an exemplary wind turbine according to one or more embodiments shown or described herein.

Referring now to FIG. 1, a perspective view of a wind turbine 1 is illustrated. The wind turbine 1 can generally comprise a nacelle 4 mounted on a tower 2. A plurality of wind turbine rotor blades 100 can be connected to a rotor hub 8 which can be connected to a main flange that turns a main rotor shaft (not illustrated). The wind turbine power generation and control components can be housed within the nacelle 4. It should be appreciated that the wind turbine 1 illustrated in FIG. 1 is provided for illustrative purposes only and not intended to limit the application of this disclosure to a specific wind turbine type or configuration.

The wind turbine rotor blades 100 may define any suitable aerodynamic profile. Thus, in some embodiments, the wind turbine rotor blades 100 may define an airfoil shaped cross section. For example, the wind turbine rotor blades 100 may also be aeroelastically tailored. Aeroelastic tailoring of the wind turbine rotor blades 100 may entail bending the wind turbine rotor blades 100 in generally a chordwise direction x and/or in a generally spanwise direction z. In some embodiments, aeroelastic tailoring of the wind turbine rotor blades 100 may additionally or alternatively comprise twisting the wind turbine rotor blades 100, such as by twisting the wind turbine rotor blades 100 in generally the chordwise direction x and/or the spanwise direction z.

Figure 2:
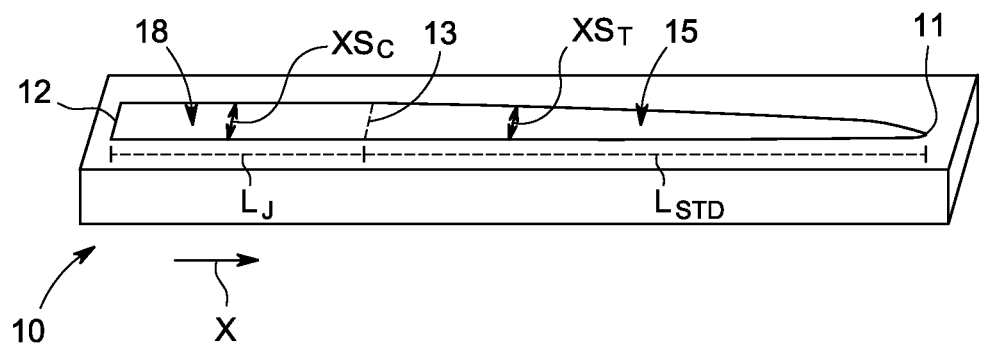
FIG. 2 is a schematic illustration of an exemplary variable length blade tip mold according to one or more embodiments shown or described herein.

Referring now to FIG. 2, a variable length blade tip mold 10 is illustrated. The variable length blade tip mold 10 can be used to manufacture a plurality of tip assemblies (e.g., elements 110, 210 and 310 illustrated in FIG. 3) for wind turbine rotor blades (e.g., elements 100, 200 and 300 illustrated in FIG. 4). The variable length blade tip mold 10 comprises a standard tip mold section 15 and a variable length joint mold section 18. The standard tip mold section 15 comprises a tapered profile $XS_T$ and extends for a standard length $L_{STD}$. The standard length $L_{STD}$ means that every tip assembly (e.g., elements 110, 210, and 310 illustrated in FIG. 3) manufactured from the same variable length blade tip mold 10 will have the same standard tip portion (e.g., elements 115, 215 and 315 illustrated in FIG. 3). The tapered profile $XS_T$ can comprise any aerodynamic profile that may be used for an outermost portion of a wind turbine rotor blade (e.g., elements 100, 200 and 300 illustrated in FIG. 4). For example, in some embodiments the tapered profile $XS_T$ can comprise a substantially airfoil-like profile. However, it should be appreciated that any other aerodynamic profile may alternatively or additionally be realized.

Still referring to FIG. 2, the variable length blade tip mold 10 further comprises a variable length joint mold section 18 extending from the standard tip mold section 15. While the variable length blade tip mold 10 is illustrated as a single unitary piece, it should be appreciated that in some embodiments, the standard tip mold section 15 and the variable length joint mold section 18 may comprise two separate pieces that match up at the transition (located at the second end 13 of the variable length joint mold section 18).

Figure 5:
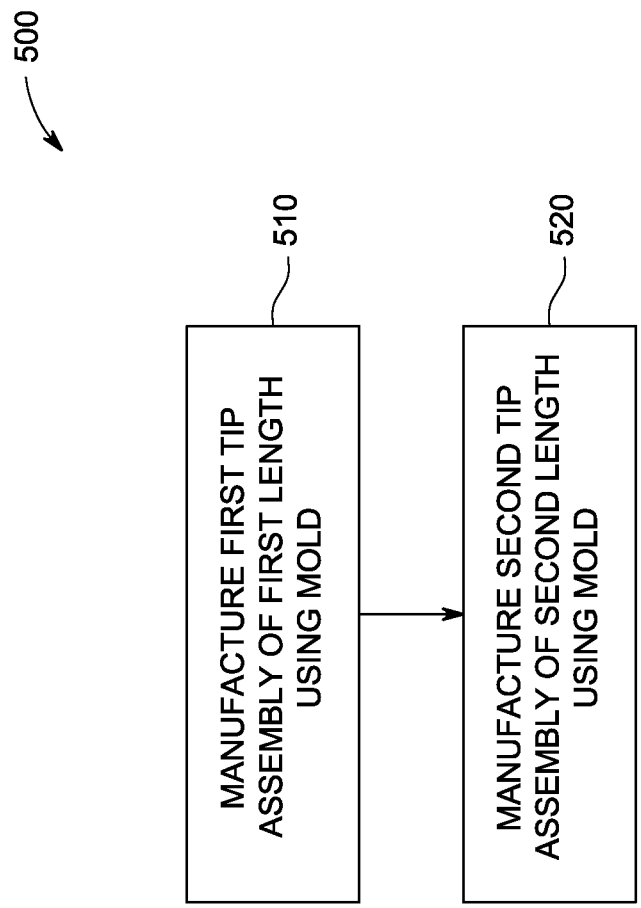
FIG. 5 is an exemplary method for manufacturing wind turbine rotor blade tips according to one or more embodiments shown or described herein.

The variable length joint mold section 18 comprises a first end 12 and a second end 13 that have a constant cross section $XS_C$. With reference to FIGS. 2 and 5, the first end 12 comprises the end that connects to the base assembly 150 of the wind turbine rotor blade 100 while the second end comprises the end that connects to the standard tip portion 115 of the wind turbine rotor blade 100. In some embodiments, such as that illustrated in FIG. 2, the variable length joint mold section comprises a constant cross section $XS_C$ for its entire joint mold length $L_J$ in the chordwise direction x. In other embodiments (not illustrated), the first end 12 and the second end 13 may comprise a constant cross section $XS_C$ while the cross section between the first end 12 and the second end periodically, fluidly, or otherwise varies along the joint mold length $L_J$. For example, in embodiments, where the cross section varies between the first end 12 and the second end 13, the cross section may oscillate in different directions. In even some embodiments, the cross section may return to the constant cross section $XS_C$ at one or more intervals between the first end 12 and the second end 13 while oscillating there between.

Figure 3:
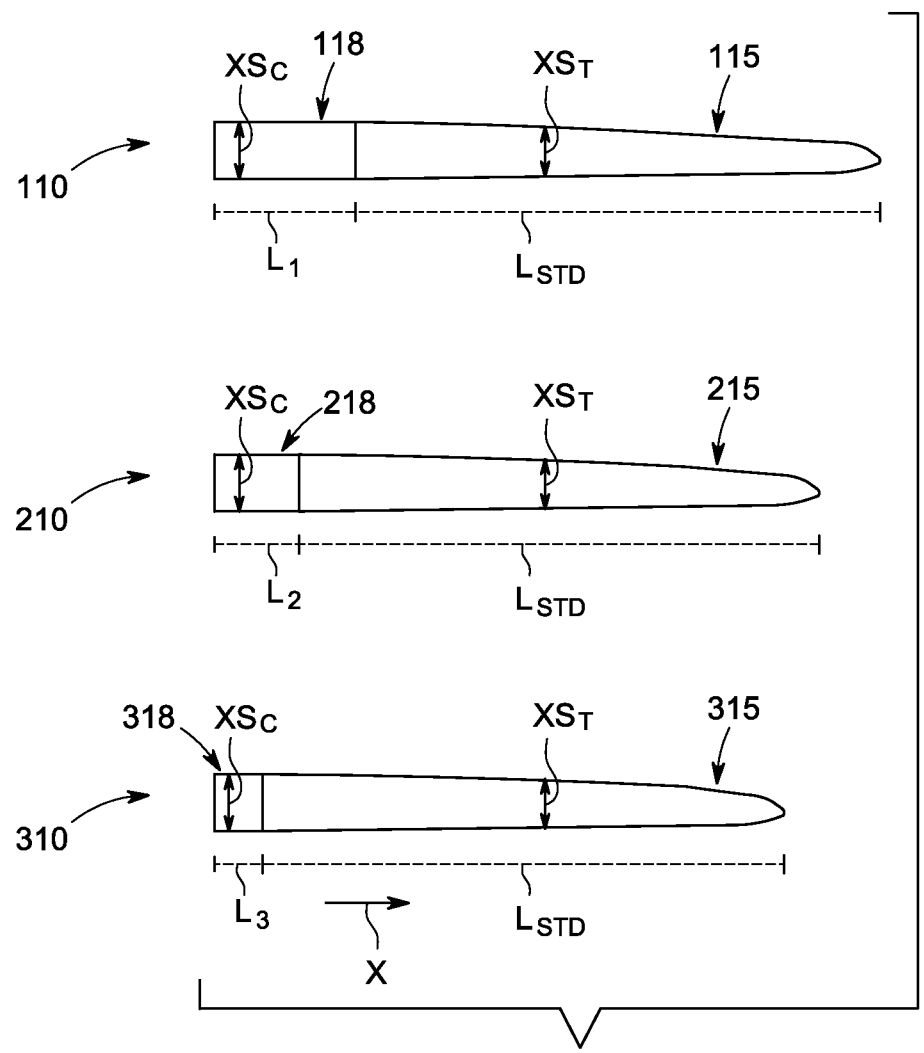
FIG. 3 is a schematic illustration of a plurality of tip assemblies manufactured from the variable length blade tip mold presented in FIG. 2 according to one or more embodiments shown or described herein.
Figure 4:
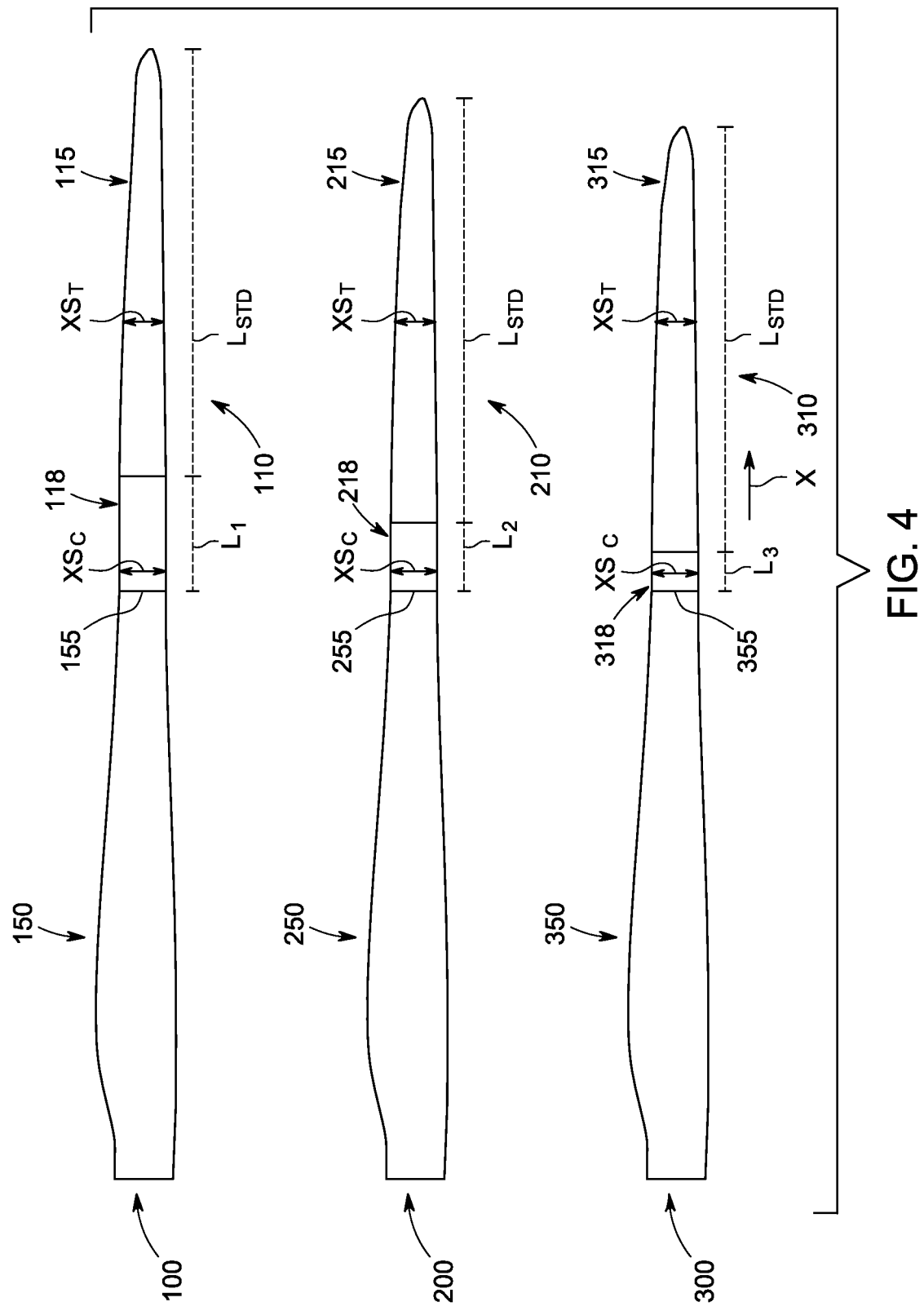
FIG. 4 is a schematic illustration of a plurality of wind turbine rotor blades incorporating the plurality of tip assemblies presented in FIG. 2 according to one or more embodiments shown or described herein.

The constant cross section $XS_C$ at the first end 12 and the second end 13 (and potentially for the entire joint mold length $L_J$ there between) can comprise any profile that allows for the variable length joint portion 118 of a tip assembly 110 (as illustrated in FIG. 3) to be connected with a base assembly 150 of a wind turbine rotor blade 100 (as illustrated in FIG. 4) as will become appreciated herein. For example, in some embodiments the variable length joint mold section 18 can comprise a substantially tubular shape having a constant cross section $XS_C$ at the first end and the second end (and potentially along its entire joint mold length $L_J$ in the chordwise direction x). In some embodiments, the variable length joint mold section 18 can comprise a substantially airfoil-like profile having a constant cross section $XS_C$ at the first end 12 and the second 13. The airfoil profile can either be straight or twisted about its joint mold length $L_J$. The constant cross section $XS_C$ at the first end 12 and the second end 13 means that while every tip assembly (e.g., elements 110, 210, and 310 illustrated in FIG. 3) manufactured from the same variable length blade tip mold 10 will have the same standard tip portion (e.g., elements 115, 215 and 315 in FIG. 3), each tip assembly (e.g., elements 110, 210, and 310 illustrated in FIG. 3) can have a different length variable length joint portion (118, 218, and 318 in FIG. 3) providing a custom length for the overall wind turbine rotor blade (e.g., elements 100, 200 and 300 illustrated in FIG. 4). As will become better appreciated herein, this can allow for a wind turbine rotor blade (e.g., elements 100, 200 and 300 illustrated in FIG. 4) to be modified with a tip assembly (e.g., elements 110, 210, and 310 illustrated in FIGS. 3 and 4) of optimal length without the need for multiple molds.

The variable length blade tip mold 10 can comprise any material or materials that allows for the manufacturing of a plurality of wind turbine rotor blades 100 therefrom. For example, in some embodiments, the variable length blade tip mold 10 can comprise one or more filler materials and or structural support materials. The structural support materials can support and/or comprise a structure shaped as a negative profile of a tip assembly 110 (such that the tip assembly 110 can be manufactured by laying the necessary materials in the mold). The filler materials and or structural support materials may comprise a variety of materials such as low density materials (e.g., foams, balsa woods, corks or the like) or more stiff and durable materials (e.g., laminate composites, fiberglass, ceramics, polymers, metals, woods or the like). In some embodiments, the variable length blade tip mold 10 may comprise a metal base and/or a plurality of support joists. In even some embodiments, the variable length blade tip mold 10 may comprise a fiberglass surface. However, while specific materials are listed herein, it should be appreciated that the variable length blade tip mold 10 may additionally or alternatively comprise any other suitable material for manufacturing a tip assembly 110 therefrom.

Referring now to FIGS. 2 and 3, a plurality of tip assemblies 110, 210 and 310 are illustrated that can be manufactured from the same variable length blade tip mold 10. The plurality of tip assemblies 110, 210 and 310 may be manufactured via the variable length blade tip mold 10 using any materials and available processes such that the resulting tip assembly 110, 210, and 310 can be connected with a base assembly 150 to form a wind turbine rotor blade 100 (as best illustrated in FIG. 4). For example, if the base assembly 150 is already identified prior to the manufacturing of one of the tip assemblies 110, 210 and 310, then the tip assemblies 110, 210 and 310 may be manufactured using common materials (i.e., the same or substantially similar materials) to mimic the materials and construction of the preexisting base assembly 150. Such embodiments may help ensure consistent performance across the entire wind turbine rotor blade 100 by reducing or eliminating changes in mechanical properties along the chordwise direction x. Moreover, to allow for the tip assemblies 110, 210 and 310 to comprise standard tip portions 115, 215, and 315 but different length variable length joint portions 118, 218, and 318, the tip assemblies may be built by laying materials starting at the tip 11 of the variable length blade tip mold 10 and continuing to the first end 12 while passing through the transition between the two portions (located at the second end 13 of the variable length joint portions 118, 218 and 318.

Each of the tip assemblies 110, 210 and 310 comprise a standard tip portion (115, 215 and 315 respectively) and a variable length joint portion (118, 218 and 318 respectively). The standard tip portions 115, 215 and 315 for each of the respective tip assemblies 100, 200 and 300 each comprise the same size, shape and configuration based off of the standard tip mold section 15 of the variable length blade tip mold 10. Specifically, each standard tip portion 115, 215 and 315 will comprise the same tapered profile $XS_T$ and the same standard length $L_{STD}$. However, while the variable length joint portions 118, 218 and 318 for each of the respective tip assemblies 100, 200 and 300 comprise the same constant cross section $XS_C$ at the first end 12 and the second end 13, the respective length $L_1$, $L_2$, and $L_3$ for each of the variable length joint portions 118, 218 and 318 can be unique. Thus, the overall length of each tip assembly 100, 200 and 300 can be unique based on the length $L_1$, $L_2$, and $L_3$ of the respective variable length joint portion 118, 218 and 318.

The respective length $L_1$, $L_2$, and $L_3$ of each variable length joint portion 118, 218 and 318 may be controlled during manufacturing of each respective tip assembly 110, 210, and 310. For example, in some embodiments manufacturing the blade may involve laying down or growing materials in the chordwise direction x of the blade tip assembly 110, 210, and 310 starting at the tip 11 of the variable length blade tip mold 10. As the material progresses past the transition between the standard tip mold section 15 and the variable length joint mold section 18, the manufacturing can be stopped at any length within the variable length joint mold section 18. While stopping the disposition or growth of material in the chordwise direction x within the standard tip mold section 15 of the variable length blade tip mold 10 has been presented herein, it should be appreciated that additional or alternative forms of manufacturing may also be realized that can produce a tip assembly 110, 210 and 310 with a variable length joint portion 118 that expands for any portion of the length of the variable length joint mold section 18 of the variable length blade tip mold 10. For example, in some embodiments manufacturing the blade may involve laying down or growing materials in the chordwise direction x of the blade tip assembly 110, 210 and 310 by starting at a location in the variable length joint mold section 18 and continuing toward the tip 11 of the variable length blade tip mold 10.

Referring now also to FIG. 4, a plurality of wind turbine rotor blades 100, 200 and 300 are illustrated that each respectively comprise one of the plurality of tip assemblies 110, 210 and 310. Each of the tip assemblies 110, 210 and 310 can be assembled, connected or otherwise joined with a respective base assembly 150, 250 and 350 to form a wind turbine rotor blade 100, 200 and 300. The base assembly 150, 250 and 350 can comprise a section of a wind turbine rotor blade that connects to a rotor hub (e.g., element 8 illustrated in FIG. 1) of a wind turbine (e.g., element 1 illustrated in FIG. 1). In some embodiments, the base assembly 150, 250 and 350 may comprise a newly built base assembly 150, 250 and 350 that has not yet been deployed on a wind turbine 1. For example, a plurality of standard base assemblies 150, 250 and 350 may be manufactured to subsequently be paired with one of the relevant tip assemblies 110, 210 and 310. In some embodiments, the base assemblies 150, 250 and 350 may comprise a used wind turbine rotor blade that had its original outer tip removed (e.g., from cutting, sawing or the like). Such embodiments may allow for the extension of an already manufactured wind turbine rotor blade by removing the original outer tip and replacing with a longer and/or more aerodynamically profiled tip assembly 110 selected specifically based on the targeted deployment site of that specific wind turbine. The resulting wind turbine rotor blade 100 may have any overall length such as, for example, greater than 55 meters, greater than 50 meters or greater than 65 meters. Moreover, the base assembly 150, 250 and 350 can end up comprising any percent of the overall length of the wind turbine rotor blade 100, 200 and 300 once the new tip assembly 110, 210 and 310 is installed. For example, in some embodiments, the base assembly 150, 250 and 350 may end up comprising about 60% of the overall length. In some embodiments, the base assembly 150, 250 and 350 may comprise more than 60% of the overall length. In even some embodiments, the base assembly 150, 250 and 350 may comprise less than 60% of the overall length.

The individual tip assembly 110, 210 or 310 and its respective base assembly 150, 250 or 350 may be joined together by any operable connection 155, 255 and 355. For example, in some embodiments, the tip assembly 110, 210 and 310 may be joined with the respective base assembly 150, 250 and 350 by a sleeve joint and/or bolts. In even some embodiments, a plug (not illustrated) may be used to connect the individual tip assembly 110, 210 or 310 to the respective base assembly 150, 250 or 350. The plug may, for example, be inserted into the inner diameter of both assemblies to provide a mechanical bridge there between. In some embodiments, any other connection may be used such as one or more brackets, fasteners, clamps, welds, seams or combinations thereof.

As a result, in some embodiments, a plurality of tip assemblies (e.g., 110, 210 and 310) can be manufactured from the variable length blade tip mold 10. Each of the plurality of tip assemblies (e.g., 110, 210 and 310) can comprise a standard tip portion (e.g., 115, 215 and 215) comprising a tapered profile, and a variable length joint portion (e.g., 118, 218 and 318) comprising a first end and a second end having a constant cross section. Furthermore, the variable length joint portions (e.g., 118, 218 and 318) for at least two of the tip assemblies (e.g., 110, 210 and 310) can comprise different lengths (despite being manufactured from the same variable length blade tip mold 10).

Referring now to FIG. 5, an exemplary method 500 is illustrated for manufacturing tip assemblies for wind turbine rotor blades. With additional reference to FIGS. 3 and 4, the method 500 first comprises manufacturing a first tip assembly 110 using a variable length blade tip mold 10 in step 510. The first tip assembly 110 comprises a first standard tip portion 115 and a first variable length joint portion 118. The first standard tip portion 115 comprises a standard length $L_{STD}$ and a tapered profile $XS_T$. The first variable length joint portion 118 comprises a first length $L_1$ and a constant cross section $XS_C$ at its ends (i.e., the first end 12 and the second end 13 illustrated in FIG. 2).

The method 500 further comprises manufacturing a second tip assembly 210 using the same variable length blade tip mold 10 in step 520. The second tip assembly 210 comprises a second standard tip portion 215 and a second variable length joint portion 218. The second standard tip portion 215 comprises the same standard length $L_{STD}$ and the same tapered profile $XS_T$ as the first standard tip portion 115 of the first tip assembly 110. The second variable length joint portion 218 comprises a second length $L_2$ that is different than the first length $L_1$ of the of the first variable length joint portion 118 of the first tip assembly 110, but comprises the same constant cross section $XS_C$ at its own ends as the constant cross section $XS_C$ ends of the first variable length joint portion 118 of the first tip assembly 110.

In some embodiments, the method 500 may further comprise manufacturing a third tip assembly 310 using the same variable length blade tip mold 10. The third tip assembly 310 can comprise a third standard tip portion 315 and a third variable length joint portion 318. The third standard tip portion 315 can comprise the same standard length $L_{STD}$ and the same tapered profile $XS_T$ as the first standard tip portion 115 of the first tip assembly 110 and the second standard tip portion 215 of the second tip assembly 210. The third variable length joint portion 318 can comprise a third length $L_3$ that is different than the first length $L_1$ of the first variable length joint portion 118 and the second length $L_2$ of the second variable length joint portion 218, but can comprise the same constant cross section $XS_C$ at its own ends as the cross section $XS_C$ ends of the first variable length joint portion 118 of the first tip assembly 110 and the second variable length joint portion 218 of the second tip assembly 210.

In other embodiments, a method of manufacturing a tip assembly 110 from a variable length blade tip mold 10 can include manufacturing the standard tip portion 115 from the standard tip mold section 15 comprising the tapered profile. The method can additionally include manufacturing a variable length joint portion 118 of the tip assembly 110 from the variable length joint mold section 18 comprising the first end 12 and the second end 13 having the constant cross section. The variable length blade tip mold 10 can thereby produce a plurality of tip assemblies (e.g., 110, 210 and 310) of various lengths wherein the variable length joint portion (e.g., 118, 218 and 318) connects to the standard tip portion (e.g., 115, 215 and 315).

As discussed above, in some embodiments, the entire joint mold length of the variable length joint mold section 18 comprises the constant cross section. In some embodiments, the standard tip mold section 15 connects to the variable length joint mold section 18 at a transition (e.g., located at the second end 13 of the variable length joint mold section 18) and the tapered profile of the standard tip mold section 15 at the transition can match the constant cross section.

It should now be appreciated that new or existing wind turbines may be better optimized at an individual level by incorporating a tip assembly with a chordwise length that better conforms to the specific parameters of that individual wind turbine's site location. A single variable length blade tip mold may be utilized in the manufacturing of a plurality of tip assemblies that each having a standard tip portion but a variable length joint portion. The resulting tip assemblies can thereby comprise the necessary increase or decrease in wind turbine blade length while still confirming with the standard aerodynamic profile of the blade tips while avoiding the need for multiple molds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A variable length blade tip mold for a tip assembly of a wind turbine rotor blade, the variable length blade tip mold comprising:
    a standard tip mold section comprising a tapered profile; and,
    a variable length joint mold section comprising a first end and a second end having a constant cross section, wherein the variable length blade tip mold can produce a plurality of tip assemblies of various lengths.

2. The variable length blade tip mold of claim 1, wherein the tapered profile comprises an airfoil profile.

3. The variable length blade tip mold of claim 1, wherein an entire joint mold length of the variable length joint mold section comprises the constant cross section.

4. The variable length blade tip mold of claim 1, wherein the constant cross section comprises a tubular profile of the variable length joint mold section comprises the constant cross section.

5. The variable length blade tip mold of claim 4 further comprising a metal base supporting the fiberglass surface.

6. The variable length blade tip mold of claim 1, wherein the standard tip mold section connects to the variable length joint mold section at a transition.

7. The variable length blade tip mold of claim 6, wherein the tapered profile of the standard tip mold section at the transition matches the constant cross section.

8. The variable length blade tip mold of claim 1 further comprising a fiberglass surface comprising the standard tip mold section and the variable length joint mold section.

9. The variable length blade tip mold of claim 1, wherein the standard tip mold section comprises a standard length and the variable length joint mold section comprises a joint mold length that is less than the standard length.

10. The variable length blade tip mold of claim 1, wherein the standard tip mold section and the variable length joint mold section comprise two separate pieces.

11. A method of manufacturing a tip assembly from a variable length blade tip mold, the method comprising:
    manufacturing a standard tip portion of the tip assembly from a standard tip mold section comprising a tapered profile; and,
    manufacturing a variable length joint portion of the tip assembly from a variable length joint mold section comprising a first end and a second end having a constant cross section, wherein the variable length blade tip mold can produce a plurality of tip assemblies of various lengths, and wherein the variable length joint portion connects to the standard tip portion.

12. The method of manufacturing the tip assembly of claim 11, wherein an entire joint mold length of the variable length joint mold section comprises the constant cross section.

13. The method of manufacturing the tip assembly of claim 11, wherein the standard tip mold section connects to the variable length joint mold section at a transition.

14. The method of manufacturing the tip assembly of claim 13, wherein the tapered profile of the standard tip mold section at the transition matches the constant cross section.

15. A plurality of tip assemblies manufactured from a variable length blade tip mold, each of the plurality of tip assemblies comprising:
   a standard tip portion comprising a tapered profile; and,
   a variable length joint portion comprising a first end and a second end having a constant cross section, wherein the variable length joint portions for at least two of the tip assemblies are different lengths.

16. The plurality of tip assemblies of claim 15, wherein the standard tip portion and the variable length joint portion comprise common materials for each of the at least two tip assemblies of different lengths.

17. The plurality of tip assemblies of claim 15, wherein the standard tip portion connects to the variable length joint portion section at a transition for each of the at least two tip assemblies of different lengths.

18. The plurality of tip assemblies of claim 17, wherein the tapered profile of the standard tip portion at the transition matches the constant cross section for each of the at least two tip assemblies of different lengths.

19. The plurality of tip assemblies of claim 15, wherein the standard tip portion is longer than the variable length joint portion for each of the at least two tip assemblies of different lengths.

20. The plurality of tip assemblies of claim 15, wherein an entire length of the variable length joint portion comprises the constant cross section for each of the at least two tip assemblies of different lengths.

* * * * *